W. S. IREY.
CHANGE SPEED GEARING.
APPLICATION FILED DEC. 19, 1917.

1,276,369.

Patented Aug. 20, 1918.

WITNESSES

INVENTOR
WILLIAM S. IREY,
BY
ATTORNEYS

W. S. IREY.
CHANGE SPEED GEARING.
APPLICATION FILED DEC. 19, 1917.
1,276,369.
Patented Aug. 20, 1918.
2 SHEETS—SHEET 2.
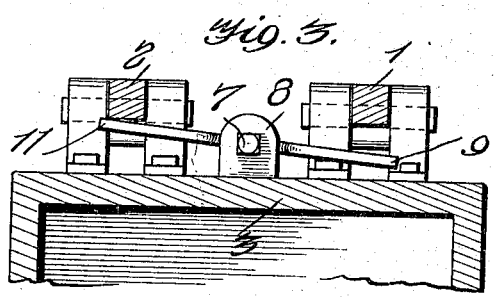
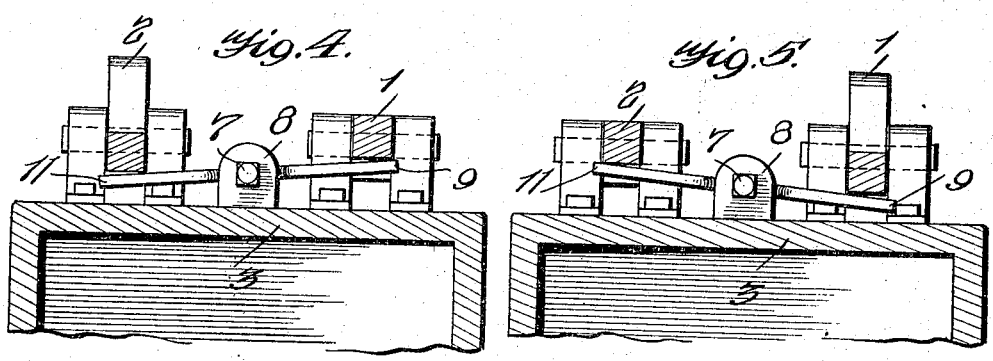
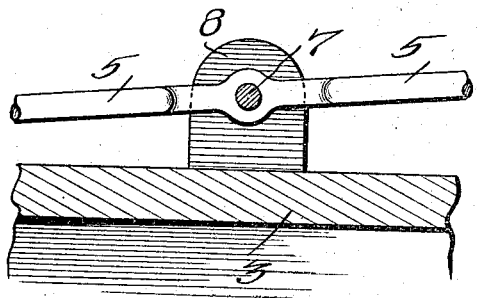
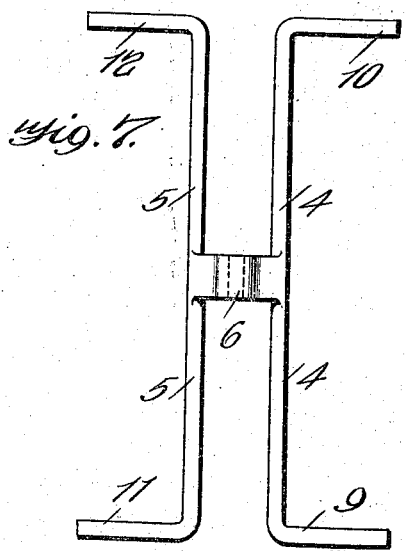
WITNESSES
E. M. Callaghan
INVENTOR
WILLIAM S. IREY,
BY
Munn &Co.
ATTORNEYS

UNITED STATES PATENT OFFICE.

WILLIAM SILAS IREY, OF SAN FERNANDO, PAMPANGA, PHILIPPINE ISLANDS.

CHANGE-SPEED GEARING.

1,276,369.  Specification of Letters Patent.  Patented Aug. 20, 1918.

Application filed December 19, 1917. Serial No. 207,870.

*To all whom it may concern:*

Be it known that I, WILLIAM S. IREY, a citizen of the United States, and a resident of San Fernando, in the Province of Pampanga, Philippine Islands, have made certain new and useful Improvements in Change-Speed Gearing, of which the following is a specification.

This invention is supplementary or adjunctive in nature to that for which on May 22, 1917, I filed an application for patent in the United States, Serial No. 170056, and relates to means for automatically returning a shift member from a set position to neutral position when another lever is operated to change the speed, thereby preventing the "killing" of the engine by the locking of the speed change gearing internally.

Referring to the drawing:

Fig. 3 is a transverse section on the line 3—3 of Fig. 1, looking in the direction of the arrows.

Figs. 4 and 5 are views similar to Fig. 3 showing different relations of the parts.

Fig. 6 is a detailed view showing more clearly the manner of mounting the shift member.

Fig. 7 is a top plan view of the shift member.

Corresponding and like parts are referred to in the following description and indicated in the several views of the drawings by like reference characters.

Figure 1:
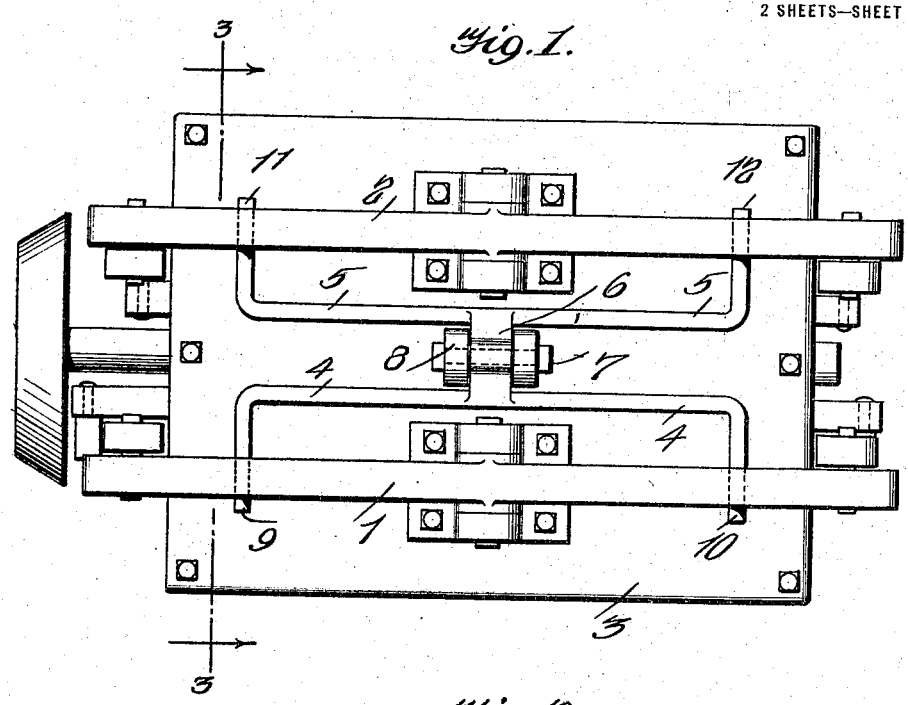
Figure 1 is a top plan view of a change speed gearing embodying the invention.
Figure 2:
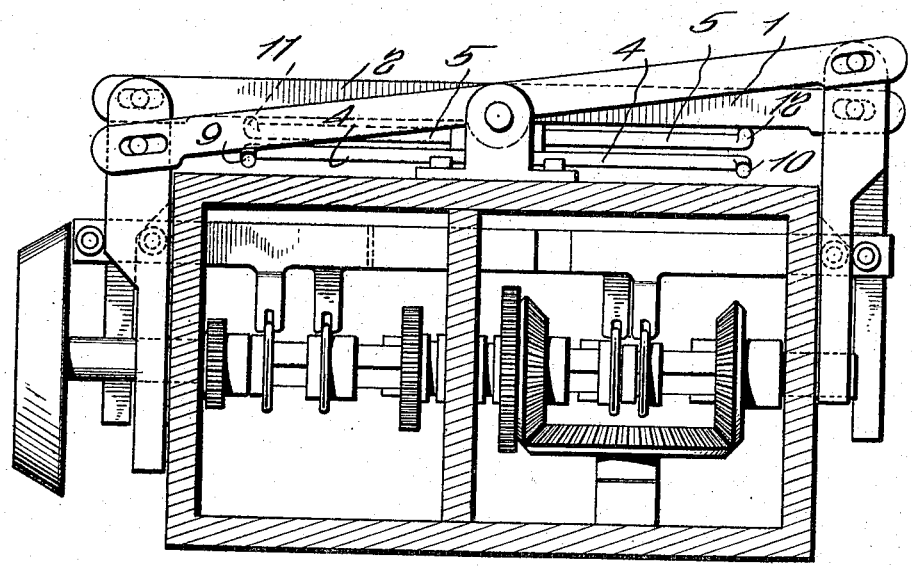
Fig. 2 is a longitudinal section.

The clutch mechanism and the change speed gearing are substantially the same as disclosed in my application herein identified. The levers 1 and 2 are likewise substantially the same as the corresponding parts embodied in my previous application. The levers 1 and 2 are adapted to operate the clutch and change speed gearing, and are mounted upon a support or base 3 which constitutes the casing inclosing the transmission and clutch operating devices.

The purpose of the present invention is to automatically return either one of the levers 1 or 2 to a neutral position when the remaining lever is operated to change the speed, thereby preventing locking of the gearing and a killing of the engine.

In accordance with the invention a shift member of substantially H-form is provided, and is mounted upon the support 3 so as to rock or tilt laterally. The shift member comprises longitudinal elements 4 and 5, and a centrally disposed connecting element 6, which is formed midway of its ends with an eye to receive a pivot fastening 7, upon which the shift member is rockably mounted. The pivot fastening 7 is supported at its ends in upstanding ears or lugs 8.

The longitudinal element 4 is provided with lateral extensions 9 and 10, at its ends, which project beneath opposite end portions of the lever 1. The longitudinal element 5 is provided with lateral extensions 11 and 12 at its ends which project beneath opposite end portions of the lever 2. When levers 1 and 2 are in neutral position, that is, in the same plane, the shift member occupies a position with its lateral extensions so disposed that when operating either one of the levers 1 or 2, the shift member will be rocked to bring its corresponding lateral extensions into contact with the lower side of both end portions of the remaining lever, with the result that when the last mentioned lever is operated, the lever previously actuated will be returned to neutral position, thereby releasing the clutch preliminary to changing the speed.

It will be understood from the foregoing taken in connection with the accompanying drawing, that when one or the other of the levers 1 or 2 is set, and the remaining lever is operated to change the speed, the first lever is returned to neutral position, thereby preventing the internal locking of the gearing and the killing of the engine.

I claim:—

1. In a change speed gearing, and in combination with levers for operating the same, a pivoted, laterally rocking shift member mounted between and in coöperative relation with such levers whereby when one of such levers is set and the remaining lever is operated, the said lever is automatically returned to neutral position.

2. In a change speed gearing, and in combination with levers for operating the same pivoted midway of their ends, a shift member pivotally mounted between the levers and adapted to rock laterally and having extensions projecting across opposite end portions of the levers to insure the returning of one of the levers when set to neutral position when the remaining lever is operated to change the speed.

3. In change speed gearing embodying operating levers pivotally mounted intermediate of their ends, a shift member pivotally mounted between the levers so as to rock laterally and having opposite extensions projecting beneath opposite end portions of the levers, whereby when one of such levers is set and the remaining lever is operated the said lever is returned to neutral position.

4. In change speed gearing embodying parallel levers pivotally supported midway of their ends, a shift member of substantially H form pivoted by means of its cross element to rock laterally and having outwardly projecting terminal extensions extending beneath opposite end portions of the levers whereby when one of such levers is set and the remaining lever is operated, the set lever is automatically returned to neutral position.

WILLIAM SILAS IREY.